US008323610B2

(12) United States Patent
Krämer et al.

(10) Patent No.: US 8,323,610 B2
(45) Date of Patent: Dec. 4, 2012

(54) CATALYST FOR THE OXIDATION OF SO₂ TO SO₃

(75) Inventors: Michael Krämer, Mannheim (DE);
Markus Schubert, Ludwigshafen (DE);
Thomas Lautensack, Alteiningen (DE);
Thomas Hill, Ludwigshafen (DE);
Reinhard Körner, Frankenthal (DE);
Frank Rosowski, Mannheim (DE);
Jürgen Zühlke, Speyer (DE)

(73) Assignee: BASF SE (DE)

(*) Notice: Subject to any disclaimer, the term of this patent is extended or adjusted under 35 U.S.C. 154(b) by 14 days.

(21) Appl. No.: 13/084,934

(22) Filed: Apr. 12, 2011

(65) Prior Publication Data
US 2011/0250124 A1 Oct. 13, 2011

Related U.S. Application Data

(60) Provisional application No. 61/322,940, filed on Apr. 12, 2010.

(51) Int. Cl.
C01B 17/79 (2006.01)
B01J 23/22 (2006.01)
B01J 27/053 (2006.01)
B01J 37/00 (2006.01)
B01J 37/02 (2006.01)

(52) U.S. Cl. ........ 423/533; 423/535; 502/218; 502/300; 502/353; 502/344; 502/439

(58) Field of Classification Search ............... 423/533, 423/535; 502/218, 300, 353, 344, 439
See application file for complete search history.

(56) References Cited

U.S. PATENT DOCUMENTS

| 1,952,057 | A |   | 3/1934  | Crawford et al. |         |
|-----------|---|---|---------|-----------------|---------|
| 3,216,953 | A |   | 11/1965 | Krempff         |         |
| 4,184,980 | A | * | 1/1980  | Sherif et al.   | 502/218 |
| 4,206,086 | A | * | 6/1980  | Sherif          | 502/263 |
| 4,285,927 | A | * | 8/1981  | Hara et al.     | 423/535 |
| 4,294,723 | A | * | 10/1981 | Hara et al.     | 502/218 |
| 4,973,570 | A | * | 11/1990 | Ukawa et al.    | 502/243 |
| 2010/0069659 | A1 |  | 3/2010 | Raichle et al. |         |
| 2010/0069660 | A1 |  | 3/2010 | Raichle et al. |         |
| 2011/0042326 | A1 |  | 2/2011 | Seeber et al.  |         |
| 2011/0118487 | A1 |  | 5/2011 | Abdallah et al.|         |
| 2011/0118526 | A1 |  | 5/2011 | Schubert et al.|         |
| 2011/0124885 | A1 |  | 5/2011 | Altwasser et al.|        |

FOREIGN PATENT DOCUMENTS

| CA | 1080205 A1 | 6/1980 |
|----|-----------|--------|
| CN | 1417110 A | 5/2003 |
| DE | 400609 C | 8/1924 |
| DE | 1235274 B | 3/1967 |
| DE | 92905 A1 | 10/1972 |
| DE | 2500264 A1 | 7/1976 |
| DE | 2640169 A1 | 3/1977 |
| DE | 400609 | 7/1991 |
| EP | 0019174 A2 | 11/1980 |
| FR | 691356 A | 10/1930 |
| GB | 337761 A | 11/1930 |
| GB | 343441 A | 2/1931 |
| GB | 1526873 A | 10/1978 |
| JP | 2002-285691 A | 10/2002 |
| JP | 2003-073997 A | 3/2003 |
| PL | 72384 | 6/1974 |
| RU | 1803180 A1 | 3/1993 |
| RU | 1824235 A1 | 6/1993 |
| RU | 2080176 C1 | 5/1997 |
| RU | 2186620 C1 | 8/2002 |
| RU | 2244590 C1 | 1/2005 |
| SU | 1558463 A1 | 4/1990 |
| SU | 1616688 A1 | 12/1990 |
| WO | WO-2006/033588 A1 | 3/2006 |
| WO | WO-2006/033589 A1 | 3/2006 |
| WO | WO-2010/072721 A2 | 7/2010 |
| WO | WO-2010/072723 A2 | 7/2010 |
| WO | WO-2010/136551 A2 | 12/2010 |
| WO | WO-2010/142714 A1 | 12/2010 |
| WO | WO-2011/023646 A1 | 3/2011 |

OTHER PUBLICATIONS

U.S. Appl. No. 12/967,337, filed Dec. 14, 2010, Wentink et al.
U.S. Appl. No. 13/052,140, filed Mar. 21, 2011, Altwasser et al.
U.S. Appl. No. 13/083,055, filed Apr. 12, 2011, Kramer et al.
Belyaeva, N.P., et al., "Influence of Porous Support Structure and Active Component Composition on Deactivation of Vanadium Catalysts in SO₂ Oxidation," React. Kinet. Ctal. Lett., 1986, vol. 30, No. 1, pp. 9-15.
Jírů, P., et al., "Povrchová struktura tuzemských křemelinových nosičů a katalysátorů pro oxydaci kysličníku siřičitého," Chemicky Prumysl, 1957, vol. 7, pp. 652-654.
Trudov, S.N., "Protsessy i Materialy Khimicheskoi Promyshlennosti," Rossiiskii Khimiko- Tekhnologicheskii Universitet im. D.I. Mendeleeva, 2000, vol. 178, pp. 34-36.
Villadsen, J., et al., "Supported Liquid-Phase Catalysts," Catal. Rev.—Sci. Eng., 1978, vol. 17, No. 2, pp. 203-272.

(Continued)

Primary Examiner — Timothy Vanoy
(74) Attorney, Agent, or Firm — Connolly Bove Lodge & Hutz LLP

(57) ABSTRACT

The invention relates to a catalyst for the oxidation of SO₂ to SO₃. The catalyst contains an active substance which contains vanadium, alkali metal compounds and sulfate applied to a support. The support contains naturally occurring diatomaceous earth, wherein the support contains at least one relatively soft naturally occurring uncalcined diatomaceous earth which has a percentage reduction of at least 35% in its $D_{50}$ value determined in a particle size determination according to the dry method in comparison with the wet method.

8 Claims, No Drawings

OTHER PUBLICATIONS

Adl, S. M., et al., "The New Higher Level Classification of Eukaryotes with Emphasis on the Taxonomy of Protists," J. Eukaryot. Microbiol., 2005, vol. 52, No. 5, pp. 399-451.

International Search Report of PCT/IB2011/051553 dated Sep. 1, 2011.

U.S. Appl. No. 13/083,055, filed Apr. 8, 2011, Krämer et al.

* cited by examiner

CATALYST FOR THE OXIDATION OF SO₂ TO SO₃

CROSS-REFERENCE TO RELATED APPLICATIONS

This application claims benefit (under 35 USC 119(e)) of U.S. Provisional Application 61/322,940, filed Apr. 12, 2010 which is incorporated by reference.

BRIEF SUMMARY OF THE INVENTION

The invention relates to a catalyst for the oxidation of $SO_2$ to $SO_3$ and also a process for producing it and its use in a process for the oxidation of $SO_2$ to $SO_3$.

Sulfuric acid is nowadays obtained virtually exclusively by oxidation of sulfur dioxide ($SO_2$) to sulfur trioxide ($SO_3$) in the contact/double contact process with subsequent hydrolysis. In this process, $SO_2$ is oxidized to $SO_3$ by means of molecular oxygen over vanadium-comprising catalysts in a plurality of adiabatic layers (beds) arranged in series. The $SO_2$ content of the feed gas is usually in the range from 0.01 to 50% by volume and the ratio of $O_2/SO_2$ is in the range from 0.5 to 5. A preferred oxygen source is air. Part of the sulfur dioxide is reacted in the individual beds, with the gas in each case being cooled between the individual beds (contact process). $SO_3$ formed can be removed from the gas stream by intermediate absorption in order to achieve higher total conversion (double contact process). The reaction is, depending on the bed, carried out in a temperature range from 340° C. to 680° C., with the maximum temperature decreasing with increasing bed number owing to the decreasing $SO_2$ content.

Present-day commercial catalysts usually comprise the active component vanadium pentoxide ($V_2O_5$) together with alkali metal oxides ($M_2O$), especially potassium oxide $K_2O$ but also sodium oxide $Na_2O$ and/or cesium oxide $Cs_2O$, and also sulfate. Porous oxides such as silicon dioxide $SiO_2$ are usually used as supports for the abovementioned components. Under the reaction conditions, an alkali metal pyrosulfate melt is formed on the support material and the active component dissolves in this in the form of oxo sulfate complexes (Catal. Rev.—Sci. Eng., 1978, vol 17(2), pages 203 to 272). The catalyst is referred to as a supported liquid phase catalyst.

The contents of $V_2O_5$ are usually in the range from 3 to 10% by weight, and the contents of alkali metal oxides are, depending on the species used and the combination of various alkali metals, in the range from 6 to 26% by weight, with the molar ratio of alkali metal to vanadium (M/V ratio) usually being in the range from 2 to 5.5. The $K_2O$ content is usually in the range from 7 to 14% by weight and the sulfate content is in the range from 12 to 30% by weight. In addition, the use of numerous further additional elements, for example chromium, iron, aluminum, phosphorus, manganese and boron, has been reported. As porous support material, use is made predominantly of $SiO_2$.

Such catalysts are usually produced on an industrial scale by mixing aqueous solutions or suspensions of the various active components, for example appropriate vanadium compounds ($V_2O_5$, ammonium vanadate, alkali metal vanadates or vanadyl sulfates) with alkali metal salts (nitrates, carbonates, oxides, hydroxides, sulfates), sometimes together with sulfuric acid and other components which can function as pore formers or lubricants, for example sulfur, starch or graphite, with the support material. The resulting viscous composition is processed to give the desired shaped bodies in the next step and finally subjected to thermal treatment (drying and calcination).

The properties of the catalyst are determined firstly by the active composition content, the type and amount of the alkali metal used, the M/V ratio and the use of any further promoters and secondly also by the type of support material used. A support material which is stable under reaction conditions helps to increase the surface area of the melt and thus the number of accessible dissolved active component complexes. The pore structure of the support material is of central importance here. Small pores stabilize the liquid state and therefore reduce the melting point of the salt melt (React. Kinet. Catal. Lett., 1986, vol. 30 (1), pages 9 to 15) and also produce a particularly high surface area. Both effects lead to increased reactivity in the lower temperature range, i.e. according to the assignment in DD92905, in the temperature range <400° C. Large pores are particularly relevant at high temperatures (reaction temperatures of >440° C.) in order to avoid transport limitation.

Apart from the catalytic activity of a catalyst, its life is also of tremendous importance. The life is influenced firstly by poisons which get into the reactor both from the outside together with the feed gas and gradually accumulate in the bed and also via impurities which are comprised in the starting materials such as the silicon dioxide support and become mobile under reaction conditions and can react with sulfate ions and thus have an adverse effect on the properties of the catalyst. Examples of such impurities are alkaline earth metal compounds (e.g. calcium compounds), iron compounds or aluminum compounds. In addition, the catalyst can also simply sinter under extreme conditions and thus gradually lose its active surface area. The pressure drop over the bed is also of very particular importance; this should be very low and increase very little over the life of the catalyst. For this purpose, it is necessary for a freshly produced catalyst to have very good mechanical properties. Typical parameters measured for this purpose are, for example, the abrasion resistance or the resistance to penetration of a cutter (cutting hardness). In addition, the tapped density of the catalyst also plays a central role since only in this way can it be ensured that a particular, necessary mass of active composition is introduced into the given reactor volume.

As inert materials for commercial sulfuric acid catalysts, use is made predominantly of inexpensive, porous materials based on $SiO_2$. Both synthetic variants of $SiO_2$ and natural forms of $SiO_2$ are used here.

Synthetic variants generally enable the desired support properties such as pore structure or mechanical stability to be set appropriately. RU 2186620 describes, for example, the use of precipitated silica gel as support for a sulfuric acid catalyst. DE 1235274 discloses a process for the oxidation of $SO_2$ using a catalyst based on $V_2O_5/K_2O/SiO_2$, wherein catalysts having an appropriately matched pore microstructure are used at different working temperatures. These compounds can be obtained, for example, by use of particular synthetic $SiO_2$ components such as precipitated sodium water glass. SU 1616-688 describes the use of amorphous synthetic $SiO_2$ having a high surface area. However, such components have the disadvantage of relatively high production and materials costs.

For this reason, naturally occurring silicon dioxides (also referred to as kieselguhr or diatomaceous earth), which as natural product can be obtained significantly more cheaply but often deviates in terms of their properties from the desired optimum, are frequently used in industrial practice. The authors of SU 1803180 use kieselguhr as support for such a catalyst. CN 1417110 discloses a catalyst for the oxidation of $SO_2$ which is based on $V_2O_5$ and $K_2SO_4$ and in which the kieselguhr used originates from a particular province in China.

The properties of a sulfuric acid catalyst can also be influenced by the type of pretreatment of the pure natural support material. Fedoseev et al. report, for example, modification of the pore structure (shift of the maximum to smaller pores) of a vanadium-based sulfuric acid catalyst by mechanical comminution of the kieselguhr (Sbornik Nauchnykh Trudov-Rossiiskii Khimiko-Tekhnologicheskii Universitet im. D. I. Mendeleeva (2000), (178, Protsessy i Materialy Khimicheskoi Promyshlennosti), 34-36 CODEN: SNTRCV). This results in improved mechanical stability. Disadvantages of this modification are firstly the use of an additional working step (comminution of the support for 12 h) and secondly the reduced catalytic activity resulting therefrom.

SU 1824235 describes a catalyst for the oxidation of $SO_2$ to $SO_3$ for a high-temperature process, wherein the kieselguhr support used comprises from 10 to 30% by weight of clay minerals and is calcined at from 600 to 1000° C. and subsequently comminuted before mixing with the actual active components, where at least 40% of the calcined kieselguhr has a particle diameter of <10 µm. In this example, too, an additional working step (comminution) is necessary.

Numerous documents describe optimization of the catalyst properties by joint use of natural and synthetic $SiO_2$ variants. DE 400609 discloses a catalyst for the oxidation of $SO_2$ which comprises vanadium compounds and alkali metal compounds on a support material having a defined pore structure, wherein different $SiO_2$ components having different pore diameters are mixed with one another in defined ratios so that the resulting support has a high proportion of pores having a diameter of <200 nm. A similar approach is followed in WO 2006/033588, WO 2006/033589 and RU 2244590. There, catalysts for the oxidation of $SO_2$ which are based on $V_2O_5$, alkali metal oxides, sulfur oxide and $SiO_2$ and have an oligomodal pore distribution matched to the respective working temperature range are described. Such a defined pore microstructure can be set, for example, by combining synthetic silicon dioxide with natural kieselguhr. RU 2080176 describes a positive effect on the hardness and activity of a sulfuric acid catalyst based on $V_2O_5/K_2O/SO_4/SiO_2$ by an addition of $SiO_2$ waste obtained in the production of silicon to the kieselguhr. A similar effect is found in SU 1558-463 as a result of the addition of silica sols to the kieselguhr.

U.S. Pat. No. 1,952,057, FR 691356, GB 337761 and GB 343441 describe combined use of natural kieselguhr with synthetic $SiO_2$ in the form of the appropriate potassium water glasses. The synthetic silicon component is applied from an aqueous solution to the kieselguhr, for example by precipitation, so that the ultimate result is $SiO_2$-encased kieselguhr particles which can be impregnated with the appropriate active components. The catalysts produced in this way display improved properties such as hardness or catalytic activity.

DE 2500264 discloses a vanadium-based catalyst for the oxidation of $SO_2$, where a mixture of kieselguhr with asbestos and bentonite is admixed with potassium water glass solution and is then used as support component having increased mechanical stability.

Apart from exclusive use of synthetic or natural $SiO_2$ variants or use of a mixture of synthetic and natural $SiO_2$ variants, it is also possible to use mixtures of different natural $SiO_2$ variants. Jiru and Brüll describe modification of the pore structure of a particular type of kieselguhr by addition of 30% by weight of coarse kieselguhr waste from the same support, which led to a shift in the average pore diameter from 56 nm to 80 nm (Chemicky Prumysl (1957), 7, 652-4 CODEN: CHPUA4; ISSN: 0009-2789). PL 72384 claims an $SiO_2$ support based on natural kieselguhr for a vanadium catalyst, wherein 20-35% of the particles of the support are in the range from 1 to 5 µm, 10-25% are in the range from 5 to 10 µm, 10-25% are in the range from 20 to 40 µm, 10-25% are in the range from 40 to 75 µm and 1-7% are larger than 75 µm and the support is produced by calcination of the kieselguhr at 900° C. with subsequent mixing with the uncalcined kieselguhr in a ratio of from 1:1 to 1:4. DE 2640169 describes a vanadium-based sulfuric acid catalyst which has a high stability and effectiveness and in which a finely divided fresh water diatomaceous earth comprising at least 40% by weight of a calcined diatomaceous earth formed from the siliceous algae *Melosira granulata* is used as support, where the diatomaceous earth has been calcined at a temperature in the range from 510 to 1010° C. before mixing with the active component, suitable accelerators and promoters. The catalysts produced in this way have a higher catalytic activity and mechanical stability than catalysts which comprise exclusively the corresponding diatomaceous earth in uncalcined and/or uncomminuted form, regardless of whether the proportion of diatomaceous earth to be comminuted is milled before or after calcination.

It is therefore known that the mechanical stability of sulfuric acid catalysts can be optimized by mechanically comminuting the kieselguhrs used before catalyst production and admixing uncalcined kieselguhrs with corresponding calcined or calcined and comminuted kieselguhrs or with synthetic $SiO_2$ variants. However, it is found that the known approaches for improving the catalyst properties, in particular the mechanical stability, have at least one of the following disadvantages:

(i) significantly higher preparative outlay, since additional working steps such as comminution or calcination of the support or parts of the support, precipitation, filtration or washing are necessary;
(ii) transformation or partial transformation of the natural kieselguhr support into cristobalite, which is problematical in terms of human health, by prior calcination;
(iii) higher raw materials costs when mixing natural kieselguhr supports with expensive synthetic variants;
(iv) decrease in catalytic activity as a result of improvement of the mechanical properties (comminution of the natural kieselguhr support).

BRIEF SUMMARY OF THE INVENTION

It was an object of the present invention to provide a catalyst for the oxidation of $SO_2$ to $SO_3$, which can be used in a very wide temperature range and can be produced very economically and has, in particular, improved mechanical stability.

This object is achieved by a catalyst having a support comprising at least one relatively soft naturally occurring uncalcined diatomaceous earth.

The invention therefore provides a catalyst for the oxidation of $SO_2$ to $SO_3$, which comprises active substance comprising vanadium, alkali metal compounds and sulfate applied to a support comprising naturally occurring diatomaceous earth, wherein the support comprises at least one relatively soft naturally occurring uncalcined diatomaceous earth which has a percentage reduction of at least 35% in its $D_{50}$ value determined in a particle size determination according to the dry method in comparison with the wet method.

DETAILED DESCRIPTION OF THE INVENTION

A preferred embodiment of the invention is a catalyst for the oxidation of $SO_2$ to $SO_3$, which comprises active substance comprising vanadium, alkali metal compounds and sulfate applied to a support comprising naturally occurring diatoamceous earth, wherein the support comprises at least one relatively soft naturally occurring uncalcined diatomaceous earth which has a percentage reduction of at least 35% in its $D_{50}$ value determined in a particle size determination according to the dry method in comparison with the wet method and furthermore at least one relatively hard naturally occurring uncalcined diatomaceous earth which has a percentage reduction of less than 35% in its $D_{50}$ value determined in a particle size determination according to the dry method in comparison with the wet method.

The catalysts of the invention according to the preferred embodiment, whose support comprises at least one uncalcined relatively hard diatomaceous earth and in addition another uncalcined relatively soft diatomaceous earth which has a significantly lower mechanical stability than the other diatomaceous earth, have significantly better properties, in particular an improved mechanical stability, than the catalysts known hitherto. Here, it is inconsequential whether the relatively hard diatomaceous earth originates predominantly from the cylindrical siliceous alga *Melosira granulata*, for example the commercially available types MN or LCS from EP Minerals LLC, or from a plate-like siliceous alga identical or similar to the Coscinodicineae type, for example the commercially available types Celite 209, Celite 400, Masis, AG-WX1, AG-WX3 or Cy-100, or from other variants, or is an appropriate mixture of different variants of relatively hard diatomaceous earths having similar mechanical stabilities. An example of a relatively soft diatomaceous earth having a significantly lower mechanical stability is the diatomaceous earth of the Diatomite type from Mineral Resources Co.

Diatomaceous earths suitable for producing the catalysts of the invention should have a content of aluminum oxide $Al_2O_3$ of less than 5% by weight, preferably less than 2.6% by weight and in particular less than 2.2% by weight. Their content of iron(III) oxide $Fe_2O_3$ should be less than 2% by weight, preferably less than 1.5% by weight and in particular less than 1.2% by weight. Their total content of alkaline earth metal oxides (magnesium oxide MgO+calcium oxide CaO) should be less than 1.8% by weight, preferably less than 1.4% by weight and in particular less than 1.0% by weight.

For the purposes of the present invention, uncalcined diatomaceous earth is a diatomaceous earth which has not been treated at temperatures above 500° C., preferably not above 400° C. and in particular not above 320° C., before mixing with the active components. A characteristic feature of uncalcined diatomaceous earth is that the material is essentially amorphous, i.e. the content of cristobalite is <5% by weight, preferably <2% by weight and particularly preferably <1% by weight (determined by X-ray diffraction analysis).

An advantage of the present invention is that the uncalcined diatomaceous earth having a relatively low mechanical stability is not subjected to any further process steps such as calcination or comminution, so that the production process remains essentially unchanged.

For the purposes of the present invention, the measure used for the hardness or mechanical stability of a diatomaceous earth is the percentage decrease in its $D_{50}$ value determined in a particle size determination by the dry method compared to that determined by the wet method. The particle size determination can, for example, be carried out using an apparatus such as the Mastersizer 2000 from Malvern Instruments. $D_{50}$ is the average particle diameter, i.e. 50% of the particles have a diameter of not more than the value indicated as $D_{50}$.

The particle size determination by the wet method is a very gentle method in which the samples to be examined are not subjected to any significant mechanical stresses. In the wet method, about 0.1 to 2 g of the sample are dispersed in water by means of a dispersing apparatus such as the Hydro 2000G from Malvern Instruments (pump power: 2000 rpm, stirrer setting: 500 rpm) and introduced as suspension into the Mastersizer 2000.

In the particle size determination by the dry method, the samples are dispersed in an air jet, for example by means of the dispersing module Scirocco 2000A from Malvern Instruments at a pressure of 1 bar. For this purpose, about 0.5 to 2 g of the sample are placed on the vibratory chute of the dispersing unit and slowly introduced into the air jet (1 bar). Depending on the mechanical stability of the various diatomaceous earths, relatively small particles are formed in the case of relatively soft diatomaceous earths and relatively large particles are formed in the case of relatively hard diatomaceous earths during the measurement and there is therefore a greater percentage decrease in the $D_{50}$ value in the case of relatively soft diatomaceous earths. The particles of the diatomaceous earth to be examined are mechanically stressed by frictional forces and impacts with one another or with the wall of the vessel during this analysis, which leads to fracture and abrasion of the particles. The more stable the diatomaceous earth, the lower the percentage decrease in the average particle size and thus the $D_{50}$ value.

For the purposes of the present invention, diatomaceous earths are designated as hard when the percentage decrease in their $D_{50}$ value determined in a particle size determination by the dry method is less than 35% compared to the $D_{50}$ value determined by the wet method. A diatomaceous earth is designated as soft when the percentage decrease in its $D_{50}$ value determined in a particle size determination by the dry method is at least 35% compared to the $D_{50}$ value determined by the wet method.

A soft diatomaceous earth having a relatively low mechanical stability generally has a $D_{50}$ of not more than 6 µm, preferably not more than 5 µm, according to a particle size determination by means of the dry method in the Mastersizer 2000 combined with a dispersing unit Scirocco 2000A at 1 bar, while the corresponding value in the case of the relatively hard diatomaceous earths having a relatively high mechanical stability is generally at least 7 µm.

The median volume-based pore diameter (i.e. the pore diameter above and below which in each case 50% of the total pore volume is found, determined by means of mercury porosimetry) of the various diatomaceous earths which can be used for the purposes of the present invention should be in the range from 0.1 µm to 10 µm, preferably from 0.5 µm to 9 µm and in particular from 0.7 µm to 7 µm. The median volume-based pore diameter of mixtures according to the invention of uncalcined diatomaceous earths should be in the range from 0.5 µm to 9 µm, preferably from 0.8 to 7 µm and in particular from 0.9 to 5 µm. Here, the shape of the pore size distribution of the mixtures according to the invention can deviate significantly from that of the individual diatomaceous earths. Oligomodal or bimodal pore distributions or monomodal pore distributions having pronounced shoulders can result from some combinations of the various diatomaceous earths. Setting of a particular median volume-based pore diameter within the above-described limits by mixing different diatomaceous earths in various ratios is possible in principle.

In the production of the sulfuric acid catalysts according to the invention, partial breaking-up of the diatom structures occuring as a result of mechanical stress during the mixing step or the shaping step and also the application of the active composition to the diatomaceous earth support leads to a shift in the median volume-based pore diameters, so that the resulting catalyst generally has a significantly lower median volume-based pore diameter than the parent support. The median volume-based pore diameter of the sulfuric acid catalysts of the invention is in the range from 0.1 µm to 5 µm, preferably from 0.2 µm to 4 µm and in particular from 0.3 µm to 3.2 µm, with the shape of the pore size distribution of the catalysts whose supports are based on mixtures of uncalcined diatomaceous earths being able to be set via the type and ratio of the various diatomaceous earths, so that oligomodal or bimodal pore size distributions or monomodal pore size distributions having pronounced shoulders can also result here.

Particularly good catalysts are obtained when using a support material in which the proportion of relatively soft diatomaceous earths based on the total mass of the support is in the range from 10% by weight to 42% by weight, preferably in the range from 14% by weight to 37% by weight and particularly preferably in the range from 18% by weight to 32% by weight.

The catalysts of the invention generally have a cutting hardness of at least 60 N, preferably at least 70 N and particularly preferably at least 80 N. Their abrasion is generally <4% by weight, preferably <3% by weight. Their tapped density is generally in the range from 400 g/l to 520 g/l, preferably in the range from 425 g/l to 500 g/l. Their porosity is at least 0.38 ml/g, preferably at least 0.4 ml/g and particularly preferably at least 0.45 ml/g.

To determine the tapped density of a catalyst, about 1 liter of the shaped bodies are introduced via a vibrating chute into a measuring cylinder having a volume of 2 liters. This measuring cylinder is located on a tamping volumeter which taps over a defined time and thus compacts the shaped bodies in the measuring cylinder. The tapped density is finally determined from the weight and the volume.

The characteristic physical catalyst properties cutting hardness, abrasion and porosity were determined by methods analogous to those described in EP 0019174. The catalytic activity was determined by the method described in DE 4000609. A commercial catalyst as described in DE 4000609, example 3, was used as reference catalyst.

The invention further provides a process for producing the above-described catalysts for the oxidation of $SO_2$ to $SO_3$, wherein a support comprising at least one relatively soft naturally occurring uncalcined diatomaceous earth which has a percentage reduction of at least 35% in its $D_{50}$ value determined in a particle size determination according to the dry method in comparison with the wet method is admixed with a solution or suspension comprising vanadium, alkali metal compounds and sulfate.

A preferred embodiment of the invention is a process for producing the above-described catalysts for the oxidation of $SO_2$ to $SO_3$, wherein a support comprising at least one relatively soft naturally occurring uncalcined diatomaceous earth which has a percentage reduction of at least 35% in its $D_{50}$ value determined in a particle size determination according to the dry method in comparison with the wet method and furthermore at least one relatively hard naturally occurring uncalcined diatomaceous earth which has a percentage reduction of less than 35% in its $D_{50}$ value determined in a particle size determination according to the dry method in comparison with the wet method, is admixed with a solution or suspension comprising vanadium, alkali metal compounds and sulfate.

The invention further provides a process for the oxidation of $SO_2$ to $SO_3$ using the above-described catalysts. In a preferred embodiment of the invention, a gas mixture comprising oxygen and sulfur dioxide $SO_2$ is brought into contact at temperatures in the range from 340 to 680° C. with the catalyst, with at least part of the sulfur dioxide being converted into sulfur trioxide $SO_3$.

EXAMPLES

All diatomaceous earths used in the following comprise less than 4% by weight of aluminum oxide $Al_2O_3$, less than 1.5% by weight of iron(III) oxide $Fe_2O_3$ and less than 1.0% by weight of alkaline earth metal oxides (sum of magnesium oxide MgO and calcium oxide CaO). The proportion of crystalline cristobalite was below the detection limit of about 1% by weight. The loss on ignition at 900° C. was typically in the range from 5 to 12% by weight.

The synthesis of all catalysts was carried out by a method based on DE 4000609, example 3. The determination of the catalyst activity was likewise carried out by a method based on that described in DE 4000609.

TABLE 1

Average particle size $D_{50}$ of various diatomaceous earths determined by the wet method and by the dry method

| Diatomaceous earth of the type | $D_{50}$ by wet method [µm][1] | $D_{50}$ by dry method at 1 bar [µm][2] | Decrease in $D_{50}$ resulting from dry treatment [%] |
|---|---|---|---|
| MN | 9.189 | 7.418 | 19.3 |
| Masis | 15.354 | 10.132 | 34.0 |
| Celite 400 | 12.819 | 10.274 | 19.9 |
| Diatomite 1 | 8.999 | 4.927 | 45.3 |

[1] Determination of the particle size distribution by the wet method (Mastersizer 2000 with dispersion in the Hydro 2000G).
[2] Determination of the particle size distribution by the dry method at 1 bar (Mastersizer 2000 with dispersion in the Scirocco 2000A at 1 bar).

Example 1: Comparative Example 3.926 kg of a diatomaceous earth of the MN type from EP Minerals LLC, Reno, USA, were mixed with a suspension composed of 1.701 kg of 40% strength KOH, 0.563 kg of 25% strength NaOH and 0.398 kg of 90% strength ammonium polyvanadate and 2.35 kg of 48% strength sulfuric acid. 250 g of a 7.4% strength by weight aqueous starch solution were subsequently added, the mixture was intensively mixed and extruded to give 11×5 mm star extrudates. These extrudates were subsequently dried at 120° C. and calcined at 650° C.

The catalyst produced in this way had a porosity of 0.49 ml/g. The cutting hardness was 74.3 N, the abrasion was 3.0% by weight and the bulk density was 431 g/l (cf. table 2).

Example 2: Comparative Example 3.51 kg of a diatomaceous earth of the Masis type from Diatomite SP CJSC, Armenia, were mixed with a suspension composed of 1.705 kg of 40% strength KOH, 0.575 kg of 25% strength NaOH and 0.398 kg of 90% strength ammonium polyvanadate and 2.35 kg of 48% strength sulfuric acid. 250 g of a 7.4% strength by weight aqueous starch solution were subsequently added, the mixture was intensively mixed and extruded to give 11×5 mm star extrudates. These extrudates were subsequently dried at 120° C. and calcined at 650° C.

Example 3: Comparative Example 3.565 kg of a diatomaceous earth of the Diatomite 1 type from Mineral Resources Co., Lima, Peru were mixed with a suspension composed of 1.666 kg of 40% strength KOH, 0.559 kg of 25% strength NaOH and 0.396 kg of 90% strength ammonium polyvanadate and 2.35 kg of 48% strength sulfuric acid. 250 g of a 7.4% strength by weight aqueous starch solution were subsequently added, the mixture was intensively mixed and extruded to give 11×5 mm star extrudates. These extrudates were subsequently dried at 120° C. and calcined at 650° C.

Example 4

The catalyst was produced by a method analogous to examples 1 to 3 using a mixture of diatomaceous earths comprising 70% by weight of the MN type from EP Minerals and 30% by weight of the Diatomite 1 type from Mineral Resources Co. The composition of the actual active component was not varied except for slight process-related fluctuations (deviations <5% relative; $SO_4$<9% relative).

Example 5

The catalyst was produced by a method analogous to examples 1 to 3 using a mixture of diatomaceous earths comprising 20% by weight of the MN type from EP Minerals LLC, 50% by weight of the Masis type from Diatomite SP CJSC and 30% by weight of the Diatomite 1 type from Mineral Resources Co. The composition of the actual active component was not varied except for slight process-related fluctuations (deviations <5% relative; $SO_4$<9% relative).

Examples 6 and 7 describe the influence of a partial replacement of the relatively stable diatomaceous earth by a mechanically more unstable diatomaceous earth on the properties of cesium-comprising sulfuric acid catalysts.

Example 6

2.753 kg of a diatomaceous earth of the MN type from EP Minerals LLC was mixed with a suspension composed of 0.956 kg of $Cs_2SO_4$, 1.394 kg of 47% strength KOH, 0.417 kg of 90% strength ammonium polyvanadate and 1.906 kg of 48% strength sulfuric acid. 177 g of a 10.68% strength by weight aqueous starch solution were subsequently added, the mixture was intensively mixed and extruded to give 11×5 mm star extrudates. These extrudates were subsequently dried at 120° C. and calcined at 510° C.

Example 7

The catalyst was produced by a method analogous to example 6 using a mixture of diatomaceous earths comprising 50% by weight of the MN type from EP Minerals LLC, 20% by weight of the Celite 400 type from Lehmann $ Voss $ Co., Hamburg, and 30% by weight of the Diatomite 1 type from Mineral Resources Co. The composition of the actual active component was not varied except for slight process-related fluctuations (deviations <5% relative; $SO_4$<9% relative).

The combination of significantly improved mechanical properties with comparable or increased catalytic activities over the entire temperature range examined displayed by the catalysts produced according to examples 4, 5 and 7 illustrates the superiority of the catalysts of the invention.

TABLE 2

Pore volume, cutting hardness, abrasion, tapped density and catalytic properties of the catalysts produced in examples 1 to 7.

| Example | Composition of the support: MN/Masis/ Diatomite 1 [% by weight] | Porosity [ml/g] | Cutting hardness [N] | Abrasion [% by weight] | Tapped density [ml/g] | Activity at 390° C. [%] | Activity at 400° C. [%] | Activity at 410° C. [%] | Activity at 430° C. [%] | Activity at 450° C. [%] |
|---|---|---|---|---|---|---|---|---|---|---|
| 1 | 100/0/0 | 0.49 | 74.3 | 3.0 | 431 | 160 | 150 | 100 | 65 | 60 |
| 2 | 0/100/0 | 0.5 | 76.9 | 3.4 | 463 | 210 | 180 | 160 | 75 | 60 |
| 3 | 0/0/100 | 0.36 | 150.2 | 1.5 | 560 | 150 | 155 | 155 | 65 | 55 |
| 4 | 70/0/30 | 0.48 | 81.9 | 1.7 | 472 | 205 | 220 | 160 | 65 | 50 |
| 5 | 20/50/30 | 0.47 | 83.4 | 2.6 | 436 | 235 | 195 | 190 | 95 | 75 |
| 6[1] | 100/0/0 | 0.39 | 72.3 | 3.7 | 523 | 110 | 115 | 105 | 90 | 95 |
| 7[1] | 50/20[2]/30 | 0.38 | 74.2 | 2.2 | 504 | 145 | 125 | 100 | 100 | 100 |

[1]Cs-comprising sulfuric acid catalyst
[2]Use of Celite 400 instead of Masis

The invention claimed is:

1. A catalyst for the oxidation of $SO_2$ to $SO_3$, which comprises active substance comprising vanadium, alkali metal compounds and sulfate applied to a support comprising naturally occurring diatomaceous earth, wherein the support comprises at least one relatively soft naturally occurring uncalcined diatomaceous earth which has a percentage reduction of at least 35% in its $D_{50}$ value determined in a particle size determination according to the dry method in comparison with the wet method.

2. The catalyst according to claim 1, wherein the support comprises at least one relatively hard naturally occurring uncalcined diatomaceous earth which has a percentage reduction of less than 35% in its $D_{50}$ value determined in a particle size determination according to the dry method in comparison with the wet method.

3. The catalyst according to claim 1, wherein the proportion of relatively soft diatomaceous earths based on the total mass of the support is in the range from 10% by weight to 42% by weight.

4. A process for producing a catalyst for the oxidation of $SO_2$ to $SO_3$ which comprises admixing support comprising at least one relatively soft naturally occurring uncalcined diatomaceous earth which has a percentage reduction of at least 35% in its $D_{50}$ value determined in a particle size determination according to the dry method in comparison with the wet method, with a solution or suspension comprising vanadium, alkali metal compounds and sulfate.

5. The process according to claim 4, wherein the support comprises at least one relatively hard naturally occurring uncalcined diatomaceous earth which has a percentage reduction of less than 35% in its $D_{50}$ value determined in a particle size determination according to the dry method in comparison with the wet method.

6. A process for producing a catalyst for the oxidation of $SO_2$ to $SO_3$ which comprises applying an active substance comprising vanadium, alkali metal compounds and sulfate sulfate to a support comprising naturally occurring diatomaceous earth, wherein the support comprises at least one relatively soft naturally occurring uncalcined diatomaceous earth which has a percentage reduction of at least 35% in its $D_{50}$ value determined in a particle size determination according to the dry method in comparison with the wet method.

7. A process for the oxidation of $SO_2$ to $SO_3$ which comprises utilizing the catalyst according claim 1.

8. The process according to claim 7, wherein a gas mixture comprising oxygen and sulfur dioxide $SO_2$ is brought into contact at temperatures in the range from 340 to 680° C. with the catalyst.

* * * * *